May 19, 1936.  W. L. FLEISHER  2,041,056
METHOD FOR TREATING HYGROSCOPIC MATERIALS
AT SUBATMOSPHERIC PRESSURES
Filed Oct. 28, 1933  2 Sheets-Sheet 1
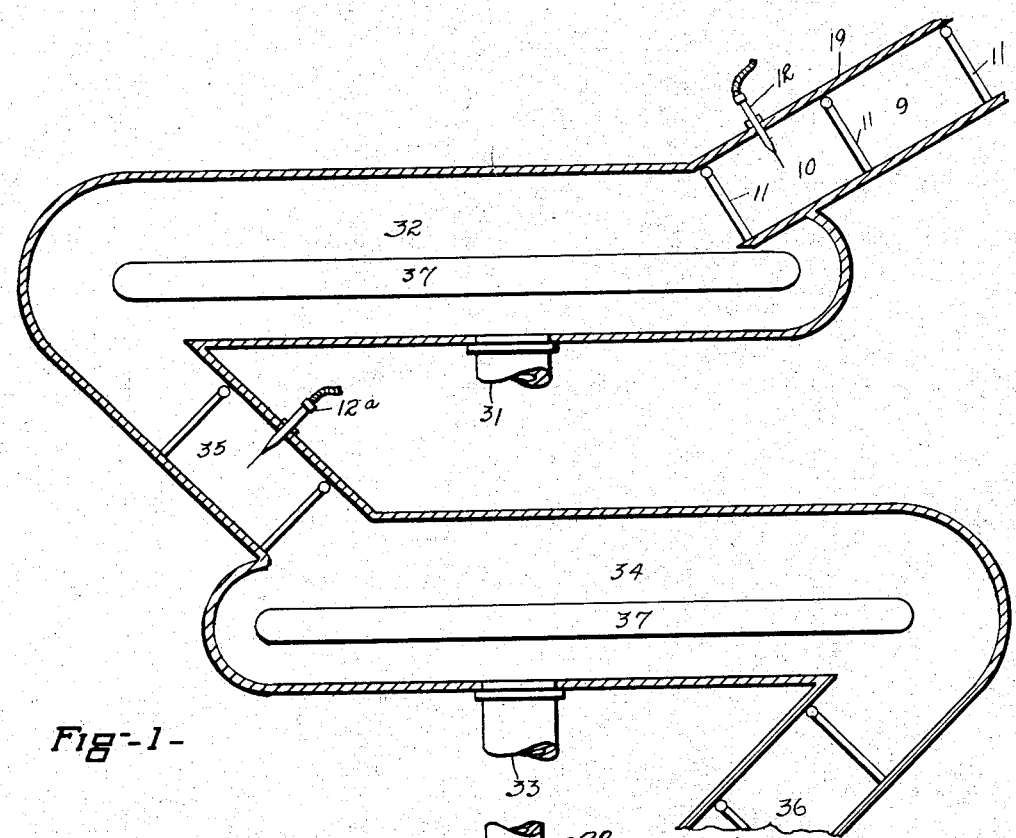
Fig-1-
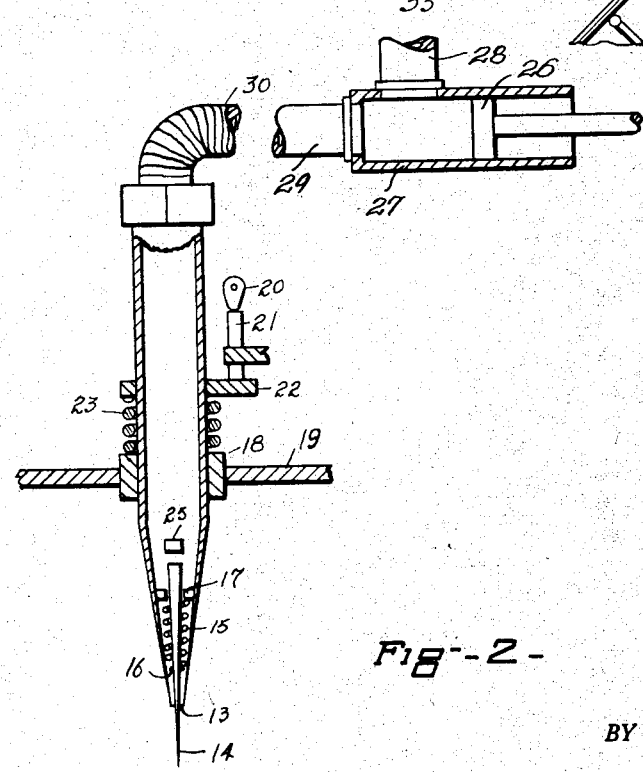
Fig-2-
INVENTOR.
Walter L. Fleisher
BY
ATTORNEY May 19, 1936.  W. L. FLEISHER  2,041,056
METHOD FOR TREATING HYGROSCOPIC MATERIALS
AT SUBATMOSPHERIC PRESSURES
Filed Oct. 28, 1933    2 Sheets-Sheet 2
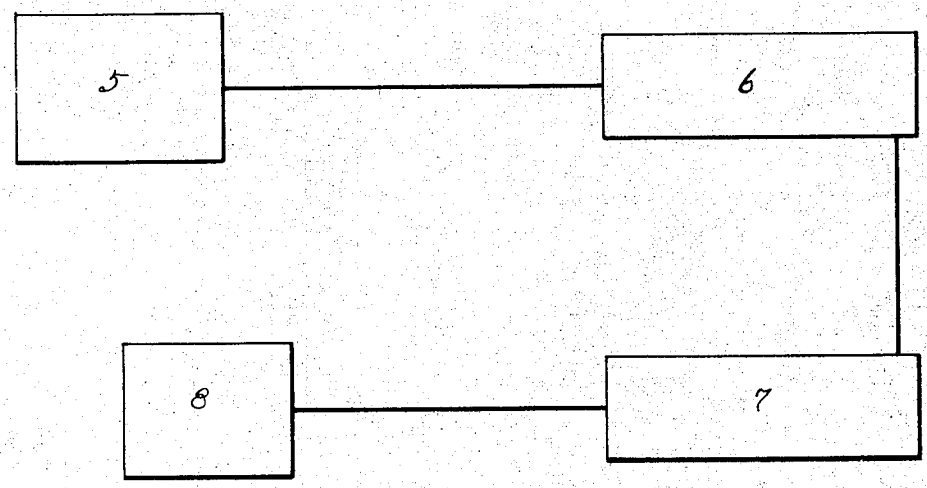
Fig-3-
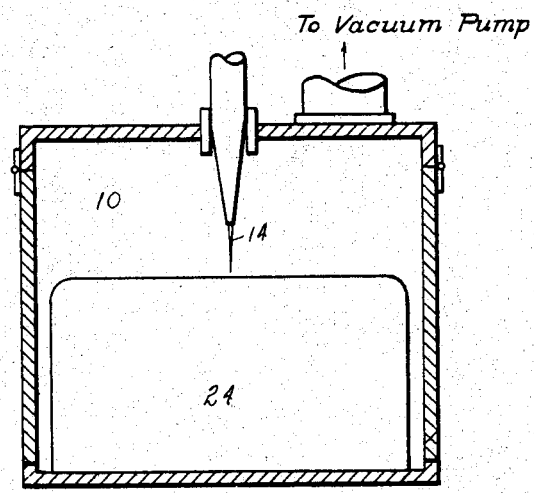
Fig-4-
INVENTOR.
Walter L. Fleisher
BY
ATTORNEY Patented May 19, 1936

2,041,056

UNITED STATES PATENT OFFICE 2,041,056

METHOD FOR TREATING HYGROSCOPIC MATERIALS AT SUBATMOSPHERIC PRESSURES

Walter L. Fleisher, New City, N. Y.

Application October 28, 1933, Serial No. 695,641

2 Claims. (Cl. 99—90)

This invention relates to a method of and means for treating substances, more especially foodstuffs, whereby a desired ingredient or ingredients or other affecting media may be distributed throughout the treated materials.

The general object of the invention is to provide for injecting substances, such as lemon, orange, raisin, or other flavors and flavoring extracts, coloring materials, vitamins in desired form, or liquid and gaseous materials, more especially into baking and confectionery products, so that the products may be permeated with the injected substance. Thus, for example, in carrying out this object, bread may be treated with a coloring material so that it will assume a desired tint. This material may have a desired flavor, and hence, the loaf, in addition to being colored, will also have its taste fixed. Similarly, by means of this invention, applicant may inject vitamins in suitable volatile carriers within the loaf and cause their distribution throughout the interior mass; and to prevent mold spores, or for reinforcing the keeping qualities of the bread, such gases as ozone, or other oxidizing media in gaseous or soluble form, may be introduced, in accordance with the invention, for treatment of the loaf.

Another object of the invention is to provide for the utilization of solid materials in connection with bakery and confectionery products, or for insertion within colloidal or porous materials. For example, such substances as butter or butter fat may be suitably liquefied or vaporized, and by the use of the invention introduced within and drawn through the treated material, to add a desired quality thereto.

A feature of the invention resides in the use of a chamber or series of chambers in combination with an injecting apparatus, whereby materials under pressures less than atmospheric within the chamber or chambers may be subjected to the action of the injecting apparatus for receiving substances injected therein.

A further feature of the invention resides in subjecting a mass to a pressure less than atmospheric, whereby the mass may be cooled and a substance injected therein simultaneously distributed throughout the mass. As described in applicant's copending application, Serial No. 667,327, filed April 22, 1933, matured into U. S. Patent No. 2,021,772, bread and other products containing water hygroscopically are cooled by the evaporation of the moisture therein to an extent corresponding to the vacuum employed to effect the evaporation; the higher the vacuum, the lower the temperature of evaporation, and the temperature of the mass from which the moisture is evaporated. In carrying out the present invention, applicant also uses this process and the cooling step to retard the volatilization of injected material from the mass as would occur if injection took place at higher temperatures. By controlling the vacuum, the temperature of evaporation is regulated, and hence, a positive control is had of the volatilizing process. This enables applicant to fix a flavor or a color, for example, substantially uniformly throughout a mass, and to regulate its intensity within the mass.

Another feature resides in the provision of means for conveying materials through a vacuum chamber and for injecting liquid or gaseous products within the materials during the conveying step.

A further feature resides in utilizing a plurality of chambers and controlling the pressures in each of the chambers, whereby the rate of cooling of materials conveyed through the chambers is controlled; and whereby products to be injected within the materials passing through the chambers will be injected in timed relation with the conveying operation and under desired conditions of pressure and temperature affecting the materials.

Still another feature covers the use of injecting apparatus which is adapted to insert fluid or gaseous products within materials to be treated, the apparatus being arranged to pierce materials passing adjacent thereto and to remain in operable condition regardless of the clogging character of the materials pierced, or the speed of the moving apparatus.

Other objects and features making for an advance in the flavoring, conditioning, sterilization, or other treatment of materials, by insertion of products, under vacuum, will be more apparent from the following description, of an illustrative way of carrying out applicant's invention, to be read in combination with the accompanying drawings, in which:

Fig. 1 shows a diagrammatic arrangement of a bread cooling apparatus;

Fig. 2 is a diagrammatic representation of an injector device in combination with a feeding device, both adapted to be used with the apparatus of Fig. 1;

Fig. 3 illustrates, in graph form, the schedule of operations, in the treatment of bread, for example, in accordance with applicant's invention; and Fig. 4 shows, diagrammatically, a cross-section of an injector chamber, having a loaf therein subjected to injector action.

This application is a continuation, in part, of co-pending application Serial No. 667,327, filed April 22, 1933, matured into U. S. Patent No. 2,021,772. In this case, however, applicant contemplates utilizing his vacuum process not only to cool bread or similar material, but also to treat materials subjected to the vacuum action, whereby new or added qualities may be imparted to the materials.

For purposes of illustration, the treatment of bread will be considered, but it should be understood that applicant does not confine himself to bread or to allied bakery products, since the invention may be utilized in numerous applications, as in the confectionery field, or in other fields wherein evaporation of hygroscopic moisture may be carried on under pressures less than atmospheric, wherein the same or similar apparatus operating on the same principles as outlined herein, may be utilized with equal advantage. Considering the cooling of bread, as a specific illustration, applicant has discovered that for effective cooling, a temperature somewhat under 100 degrees F. within the loaf is required before the bread may safely be sliced and wrapped, and that the cooling of a loaf from oven temperature to a temperature below 100 degrees F. is most expeditiously accomplished in two steps. In the first step, the loaf after it comes from the oven, is subjected to an atmospheric air cooler. The cooler may be a room to which outside air and/or recirculated air, or air from any desired source, is circulated by a suitable fan or blower system. This reduces the temperature from about 210 degrees F. to about 140 degrees F.; and this drop in temperature is sufficiently rapid as not to set up an undesirable time lag in baking operations. However, further cooling from about 140 degrees F. to a desired temperature of about 90 degrees F., the proper temperature for wrapping, would consume an appreciable amount of time and give uneven cooling throughout the loaf, if only a fan or air circulation process were employed, as is the case in most systems now used. As pointed out in applicant's copending application, the subjection of the loaves to a vacuum produces an evaporation of about one-half ounce of moisture or less when the range of cooling is regulated between the proper limits, and this action results in a drop in temperature exactly sufficient to condition the loaf for wrapping. The vacuum action may be deemed substantially instantaneous, compared to the long interval required for cooling with former systems; and this not only results in cooling the bread evenly, but also guards against the formation of mold, which often occurs in former systems where mold spores are permitted to attack and lodge themselves within the bread during the long cooling period. In the present adaptation of applicant's invention, similar vacuum action is provided for, as may be noted in Fig. 3. The bread is first conveyed from oven 5 to air cooler compartment 6. Here, the temperature of the bread is reduced, due to speedy natural fall, to about 140 degrees F. The bread is then conveyed to a vacuum cooler 7, and, as pointed out in my copending application, the temperature is rapidly reduced to about 90 degrees F., and from the cooler, the bread proceeds to a wrapper 8, where it is sliced and packaged.

Considering Fig. 1, numerals 9 and 10 represent air locks to which the bread is conveyed from air cooler 6. The air locks may be of any suitable design and their structure forms no part of this invention. For purposes of illustration, closure members 11 are suitably provided, so that they will open prior to the passage of a loaf therethrough, and close after the loaf is within the lock. While hinge members are shown, slide or other suitable types may be employed. In combination with lock 10, an excretion or injector device 12 is provided. This device comprises a hollow casing drawn out at its extremity into a frusto-conical configuration to provide small orifice 13. A needle valve 14 fits into and closes the orifice under influence of a spring 15, held in compression between a projection 16 on the needle and a collar 17 formed integrally with the tube. The tube is mounted in a bearing 18 in wall 19 of the air lock housing. Reciprocation is provided by a cam 20 through tappet rod 21, collar 22 and a spring 23 held in compression between the collar and the bearing 18. On the downstroke, needle 14 may enter a loaf 24 within lock 10, as shown in Fig. 4, or may enter any substance in such a lock, not necessarily a loaf of bread. Upon the entry of the needle in the loaf or other substance, it is forced upwardly against the tension of spring 15, thus opening orifice 13, and allowing a fluid, for example, to pass therethrough. When the head of needle valve 14 strikes lug 24, further movement of the needle valve relative to the tube is effectively prevented, and, therefore, further downward movement causes the lowermost part of the tube, i. e., the tip of the nozzle, to be forced into the loaf. Cam 20 is designed to produce any desired penetration, and when the penetration is complete, piston 26, of pump 27, will force a metered quantity of a desired substance, such as flavoring material, or vitamin content of desired character, into the bread. The piston may be suitably arranged under control of a timing device, to draw a desired amount of substance, such as flavoring extract, from a source of supply, not shown, through pipe 28 and discharge the same through outlet 29, connected to flexible connection 30, which feeds the tube; the material entering the bread through orifice 13. When the desired quantity of fluid or other matter has been injected within the loaf, the cam rotates to allow spring 23 to withdraw the lower part of the tube from the loaf. Simultaneously, spring 15 forces needle valve 14 downwardly, thereby closing nozzle 13, and additionally, ejecting any bread or other material therefrom. While flavoring material was used as an example, applicant contemplates the use of vitamins, butter fat, or other desired substances, for injection within bread or other masses, to be treated in accordance with the invention.

Referring again to Fig. 1, numeral 31 designates a tube connected to a suitable source for producing a desired vacuum in chamber 32, and tube 33 is similarly provided and connected to a suitable device for producing a vacuum in chamber 34. While two chambers are shown, any number may be employed and locks, such as 35 and 36, provided intermediate and at the extremities of a series of chambers, so that different pressures may be produced in the various chambers. In the arrangement shown in Fig. 1, it is contemplated that the air pressure in 35 be different than that in 32 (in both cases, less than atmosphere). The pressure in lock 10 would be substantially that of chamber 32 and the pressure in lock 35 would be substantially that of chamber 34. Conveyors 37 are utilized for conveying the materials, such as loaves of bread, through the chambers, and the locks are preferably arranged so that gravity feed may be relied upon for advancing the materials from the conveyors to the locks served by them. Further to ease the advance of materials, the locks, such as 9 and 19, and lock 36, may be inclined, so that the feed to and from the conveyors may also take place by gravity. The injector device may be provided in combination with different locks at different points in the system. For example, device 12 may feed a liquid shown in combination with lock 19, whereas 12a may feed ozone or vitamin content, as shown in combination with lock 35, and these two locks, as already pointed out, may be arranged to be under different air pressures less than atmospheric.

The point or points at which substances will be injected will depend upon the character of the materials injected. Thus, certain substances must be injected when the temperature corresponding to the absolute pressure is high enough to volatilize the injected material, and subsequent injections may be made thereafter at different pressures, and with materials adapted to volatilize at lower temperatures. For example, substances such as butter fat or oil carrying vitamins may be injected in the hot loaf before the loaf enters an area of sub-atmospheric pressure. When the loaf then comes under partial vacuum, the injected substances will be drawn through the loaf by reason of the lowering of the pressure on the mass. As already pointed out, further injections may be made with material adapted to volatilize at the different temperatures corresponding to the subatmospheric pressures in the various areas in which injection takes place.

If the pressure to which the substance, such as the loaf of bread, is subjected during the fluid or gaseous injection, is reduced, it is apparent that the fluid will diffuse from the point of injection throughout the loaf. In certain instances, it may be desirable to inject solids, such as butter fat, or substances which are viscous at ordinary temperatures, into the loaf or similar product. This can be accomplished by injecting the butter fat, etc., into the loaf, just as it leaves the oven—in other words, at a high temperature. The heat causes melting. Thereafter, when the loaf (or other product) is subjected to a vacuum (10 inches–20 inches), desired diffusion throughout the loaf takes place.

It is apparent that the invention may be used in numerous applications, and applicant considers within the purview hereof any arrangement wherein a vacuum is used for diffusion of substances throughout a mass subjected to the vacuum,—applicable at different temperatures and at different stages of a continuous process.

I claim:

1. A method of treating bakery products consisting in confining the products, within an area whose pressure may be controlled, after the products have left the oven and before they have cooled to a temperature suitable for wrapping, lowering the pressure within the area to remove free water from the products thereby to cool the products, and injecting material within the products while the removal of free moisture is still being carried on whereby the material replaces free moisture and is dispersed throughout the interior of the products.

2. A method of treating bakery products consisting in placing the products within a confining chamber after the products have left the oven and before they have cooled to a temperature suitable for wrapping, reducing the pressure within the chamber to produce a partial vacuum therein, the reduction in pressure being sufficient to draw free water from the products in the form of moisture vapor thereby to cool the products, and injecting material within the products at one point in the cooling operation whereby the material is dispersed through the interior of the products as the moisture is withdrawn therefrom.

WALTER L. FLEISHER.